(12) United States Patent
Lee

(10) Patent No.: US 7,638,911 B2
(45) Date of Patent: Dec. 29, 2009

(54) MOTOR

(75) Inventor: Ho Jae Lee, Gimhae-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/656,396

(22) Filed: Jan. 23, 2007

(65) Prior Publication Data

US 2008/0136278 A1 Jun. 12, 2008

(30) Foreign Application Priority Data

Dec. 6, 2006 (KR) .................. 10-2006-0122998
Dec. 6, 2006 (KR) .................. 10-2006-0122999
Dec. 6, 2006 (KR) .................. 10-2006-0123001

(51) Int. Cl.
*H02K 5/00* (2006.01)
(52) U.S. Cl. ....................................... 310/89
(58) Field of Classification Search .................. 310/89, 310/67 R, 71
See application file for complete search history.

(56) References Cited

U.S. PATENT DOCUMENTS

| | | | |
|---|---|---|---|
| 2,172,191 A | 9/1939 | Denman | |
| 2,251,674 A | 8/1941 | Gillen | |
| 3,041,487 A | 6/1962 | Newton | |
| 3,749,956 A | 7/1973 | Reiss | |
| 5,126,613 A | 6/1992 | Choi | |
| 5,670,836 A | 9/1997 | Horst | |
| 6,023,117 A * | 2/2000 | Chen | 310/91 |
| 6,131,268 A | 10/2000 | Neuenschwander | |
| 6,169,345 B1 * | 1/2001 | Bloch et al. | 310/67 R |
| 6,225,715 B1 * | 5/2001 | Hoda et al. | 310/67 R |
| 6,577,031 B2 | 6/2003 | Morooka et al. | |
| 6,873,076 B2 | 3/2005 | Kaeufl et al. | |
| 6,894,412 B2 | 5/2005 | Han et al. | |
| 7,021,418 B2 * | 4/2006 | Tominaga et al. | 180/444 |
| 2002/0030415 A1 | 3/2002 | Morooka et al. | |
| 2003/0006663 A1 | 1/2003 | Hsu | |
| 2003/0107290 A1 | 6/2003 | De Filippis | |
| 2005/0040715 A1 | 2/2005 | Nesic | |
| 2005/0167183 A1 | 8/2005 | Tominaga et al. | |

(Continued)

FOREIGN PATENT DOCUMENTS

EP 1416616 5/2004

(Continued)

OTHER PUBLICATIONS

Weizi Wang: Zhigna Wu: Wanbing Jin; Jianping Ying, "Starting methods for hall-less single phase BLDC motor", Industrial Electronics Society, 2005. IECON 2005. 32$^{nd}$ Annual Conference of IEEE Nov. 6-10, 2005 p. 5 pp.

*Primary Examiner*—Nguyen N Hanh
(74) *Attorney, Agent, or Firm*—McKenna Long & Aldridge LLP

(57) ABSTRACT

A motor includes a bracket that defines an exterior of the motor. A PCB is held within the bracket and has a circuit pattern and various elements mounted thereon. A stator is provided on the PCB and a rotor is provided within the stator. A shaft rotates together with the rotor to transmit a rotational force of the rotor. A stopper projects from an inside of the bracket to prevent the rotor from moving along the shaft.

4 Claims, 7 Drawing Sheets

U.S. PATENT DOCUMENTS

| | | |
|---|---|---|
| 2005/0218749 A1 | 10/2005 | Shin et al. |
| 2005/0237663 A1 | 10/2005 | Nguyen |
| 2006/0038452 A1 | 2/2006 | Lesak |
| 2006/0071574 A1 | 4/2006 | Stewart |
| 2006/0138883 A1 | 6/2006 | Yagai et al. |
| 2006/0208588 A1* | 9/2006 | Guttenberger ............... 310/89 |
| 2006/0279158 A1 | 12/2006 | Kim |

FOREIGN PATENT DOCUMENTS

| | | |
|---|---|---|
| EP | 1703617 | 9/2006 |
| EP | 1729398 | 12/2006 |

\* cited by examiner

MOTOR

This application claims the benefit of the Patent Korean Application Nos. 10-2006-0122998, 10-2006-0122999, and 10-2006-0123001, all filed on Dec. 6, 2006, which are hereby incorporated by reference as if fully set forth herein.

BACKGROUND OF THE INVENTION

1. Field of the Invention

The present invention relates to a motor, more particularly, to a motor that is easily fabricated with enhanced efficiency and durability, and which has a compact structure convenient to a user.

2. Discussion of the Related Art

Generally, a shading coil motor is used in to a refrigerator or a freezer as a fan motor. A shading coil as well as a main coil is wound around a stator in the shading coil motor.

The shading coil is configured to start a rotor. The shading coil, together with the main coil, forms an oval shaped magnetic field to start the rotor. When the rotor is rotating, the shading coil is no longer needed and wastes electricity.

Moreover, auxiliary teeth should be provided at the stator to wind the shading coil there around, which makes the shape of the stator complex, and the shading coil should be additionally wound around the teeth, which makes the winding complex.

Because the shading coil motor uses a 1-phase alternating current power to reduce the number of electric and electronic parts, the shading coil motor has an advantage of being low cost. However, usually the shading coil motor consumes and wastes a lot of electricity.

Also, it is difficult to control the shading coil motor and there is a further disadvantage of being large size.

Thus, demands for a motor, which can reduce electricity consumption and having a compact exterior that is easily fabricated, have been increasing. The motor may not just operate a fan but appropriately control a fan speed and torque.

SUMMARY

Accordingly, the present invention relates to a motor.

An object of the present invention is to provide a motor capable of being easily fabricated and having a compact exterior by reducing a motor mounting space, such that the motor may have broad applications.

Another object of the present invention is to provide a motor that enhances efficiency, and thereby minimize electricity loss.

A further object of the present invention is to provide a motor that may control its rotational speed or torque, and thereby enhance reliability and durability.

More specifically, cogging torque is reduced to enhance the efficiency of the motor such that the motor may be controlled more smoothly.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a motor comprises a stator core that forms a magnetic path and has a plurality of tooth parts along a circumferential direction; a tooth provided in each tooth part to wind a coil there around; and an extension part alternated with the tooth part along a circumferential direction of the stator core, and extending to an inner radial direction.

Here, the extension part secures an enough space for a magnetic flux to flow, such that efficiency of the motor is enhanced. Also, the extension part may convexly extend to the tooth part and may improve the strength of the stator core.

A plurality of unit stator cores may be multi-layered to form the stator core. In other words, the unit stator cores may be multi-layered in a direction of a shaft, that is, a longitudinal direction. This multi-layered structure may minimize a leakage flux, which may be generated in a direction perpendicular to a flux direction, such that the efficiency of the motor is improved.

By the way, a caulking part may be formed to fasten the multi-layered unit stator cores as one body. The caulking part prevents the efficiency of motor from deteriorating. Preferably, the caulking part is formed on the extension part to prevent the structural strength of the stator core from deteriorating. The caulking part is formed on the extension part having an enough predetermined thickness. Thus, it is preferred that the caulking part is formed at a center of the extension part that has the thickest thickness.

The tooth may be formed as one body with the stator core. When a unit stator is blanked and formed, the tooth also may be formed. Alternatively, the tooth may be separately formed from the stator core and then fastened to a tooth part. That is, an end of the tooth is inserted in a tooth slot formed on the tooth part to fasten the tooth to the tooth part.

Also, a groove may be further formed on an outer portion of the tooth part. The groove is formed in a longitudinal direction of the stator core to separate the stator core, that is, the unit stator cores from a blank mold smoothly.

The groove may correspond with the tooth slot and especially to a center of the tooth slot. In other words, if the tooth slot is formed on a portion within the stator core, it is preferred that the groove is formed on an outer portion of the stator core on which the tooth slot is formed. The groove may minimize variation of the stator core size generated in the tooth being inserted in the tooth slot.

By the way, the stator may further include a bobbin. The tooth is inserted at a center of the bobbin and a coil is wound around the bobbin. The bobbin insulates electricity between the tooth and the coil and fixes the coil securely.

More specifically, the bobbin includes an inner wall and an outer wall to prevent the coil from separately going out. The outer wall may be in contact with the tooth part and an inner wall of the tooth part is plate-shaped to fix the bobbin more securely.

The motor may be a BLDC motor.

More specifically, the motor includes a stator and a rotor that rotates about the stator. The stator comprises a stator core having a plurality of tooth parts formed along a circumference, in which a magnetic flux path is formed; a plurality of teeth provided on the tooth parts to be wound around by a coil; and an extension part convexly extending toward an inner radial direction, alternated with the plurality of tooth parts. The rotor has a permanent magnet to alternatively magnetize magnetic poles along an outer circumferential surface of the rotor. The extension part may be formed on every portion between two neighboring tooth parts.

Here, a pole shoe may be formed at an end of the tooth and both opposite ends of the pole shoe extend a predetermined distance in a circumferential direction to be substantially parallel with an outer circumferential surface of the rotor that faces the pole shoe.

Also, a cut part may be formed at both opposite ends or an end of the pole shoe to minimize cogging torque. Here, the cut part is formed at an end of the pole shoe in a longitudinal direction to have a width narrower than the width of the other portions of the pole shoe.

In another aspect of the present invention, the motor may further include a bracket that defines an exterior thereof and a PCB (printed circuit board) provided within the bracket on which a circuit pattern and various elements are mounted.

The stator is provided on the PCB and the rotor is provided inside or outside the stator to rotate about the stator. A shaft is further included and rotates together with the rotor to operate external load due to the rotational force of the rotor.

According to an embodiment of the present invention, a stopper is further included. The stopper may project inwardly within the bracket to limit the movement of the rotor along the shaft.

That is, the shaft is inserted in the rotor to be fastened to the rotor. If the rotor should move along the shaft due to vibration, the PCB may be damaged.

Thus, the stopper may be formed as one body with the bracket to be projected inwardly, such that the movement of the rotor is prevented.

Furthermore, a hollow portion may be formed on the PCB. And the stopper may be disposed in the hollow hole. When the PCB is mounted in the bracket, the stopper is disposed in the hollow portion of the PCB such that the position of the PCB is appropriately fixed.

The bracket may include an upper bracket and a lower bracket, which are coupled to each other. Stoppers may be formed on the upper and lower bracket, respectively. The stopper formed on the lower bracket prevents the rotor from moving downwardly toward the lower bracket, and the stopper formed on the upper bracket prevents the rotor from moving upwardly toward the upper bracket. Thus, the rotor is substantially fixed between the two stoppers.

The stopper may be projected in a cylindrical shape. Preferably, an inner or outer diameter is determined to make an upper surface of the stopper contact with an upper surface of the rotor.

According to an embodiment of the present invention, at least some portion of the PCB may be shaped to correspond with the shape of the stator. The stator may be formed in a circular shape, and accordingly some portion of the PCB may also be formed in a circular shape. The portion of the PCB where the stator is provided may be circular-shaped and the other portion may be rectangular-shaped.

Also, the shape of the bracket may correspond with the shape of the PCB. This may make the appearance of the motor compact and enhance the external beauty of the motor.

In a further aspect of the present invention, a motor includes a stator comprising a stator core that forms a magnetic flux, a plurality of tooth provided on the stator core and a bobbin provided on the tooth to have a coil wound around; and a PCB electrically connected to the coil through a fin formed at the bobbin, having the stator fixed thereto. Some portion of the PCB may be formed in a shape corresponding to that of the stator and an extension part is formed on the stator where a hole is formed to insert the fin therein.

The portion of the PCB corresponding to the shape of the stator has a same outer diameter as that of the stator. This is to prevent the exterior size of the motor from becoming large due to the size of the PCB.

Thus, at least some portion of the PCB may be formed in a circular shape.

The fin formed on the bobbin of the stator is inserted in the hole formed on the PCB to electrically connect the coil with the PCB as well as to fix the stator on the PCB.

According to the position of the fin based on the position of the bobbin, the hole in which the fin is inserted may be positioned at an outermost portion of the PCB. Thereby, the strength of the outermost portion of the PCB may deteriorate. Thus, it is preferred that an extension part extends outwardly from the portion where the hole is formed, that is, convexly outward in a circumferential direction.

Because the PCB is entirely large, the portion of the PCB where the hole is formed may have its strength reinforced. However, in this case, the PCB getting too large may cause a problem in that the external size of the motor becomes large.

The PCB may be fixedly mounted in the lower bracket. Then, it is preferred that a groove corresponding to the shape of the extension part is formed on an inner surface of the lower bracket to seat the extension part. More preferably, each shape of the upper and lower bracket corresponds with the shape of the PCB.

It is to be understood that both the foregoing general description and the following detailed description are exemplary and explanatory and should not be construed as limiting the scope of the claims.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
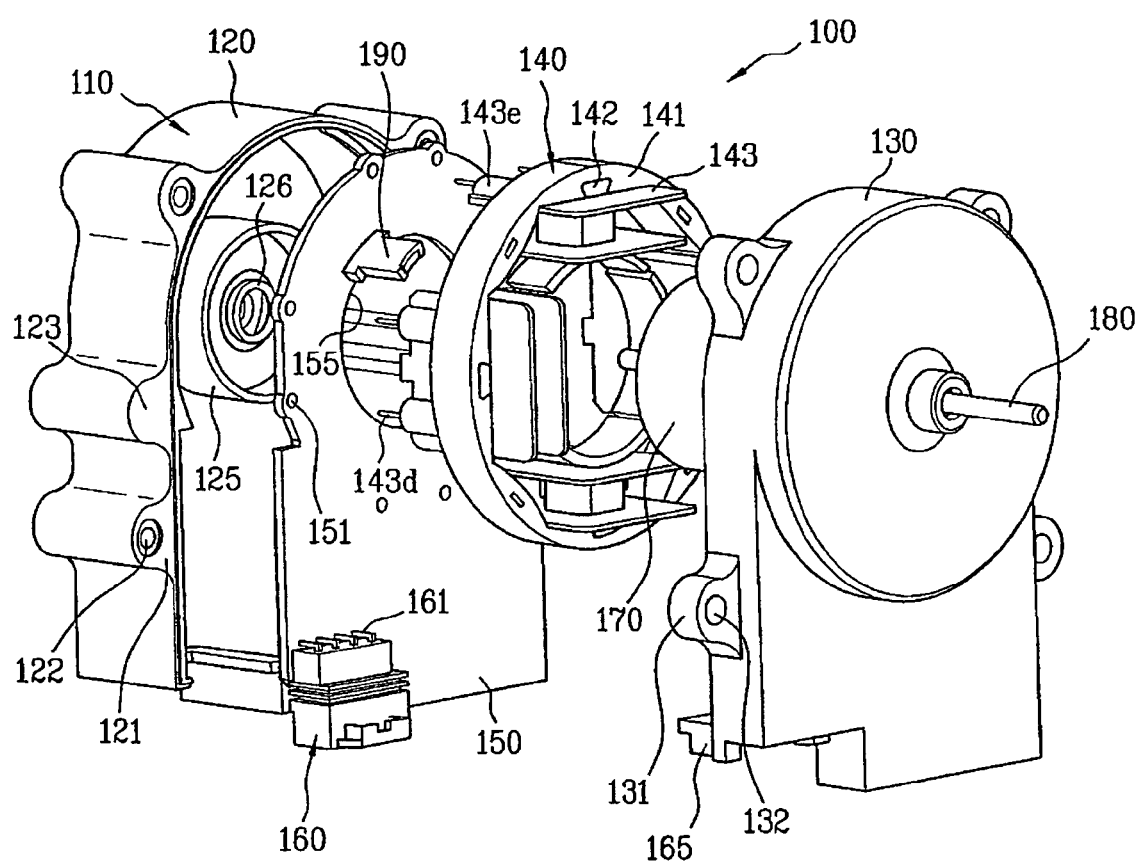
FIG. 1 is an exploded perspective view of a motor according to an embodiment of the present invention.

FIG. 1 is an exploded perspective view of a motor 100 according to an embodiment of the present invention.

As shown in FIG. 1, a motor includes a bracket 110, a PCB (printed circuit board) 150, a stator 140, a rotor 170 and a shaft 180. The bracket 110 defines an exterior of the motor. The PCB 150 is held within the bracket 110 and has a circuit pattern (not shown). Also, various elements (not shown) are mounted in the PCB 150.

The bracket 110 includes a lower bracket 120 and an upper bracket 130. The lower and upper brackets 120 and the 130 are coupled to each other to hold various components therein. To couple the lower and upper brackets 120 and 130 to each other, fastening bosses 121 and 131 may be fastened through fastening holes 122 and 132 formed on the fastening bosses 121 and 131 by a screw (not shown).

Figure 5:
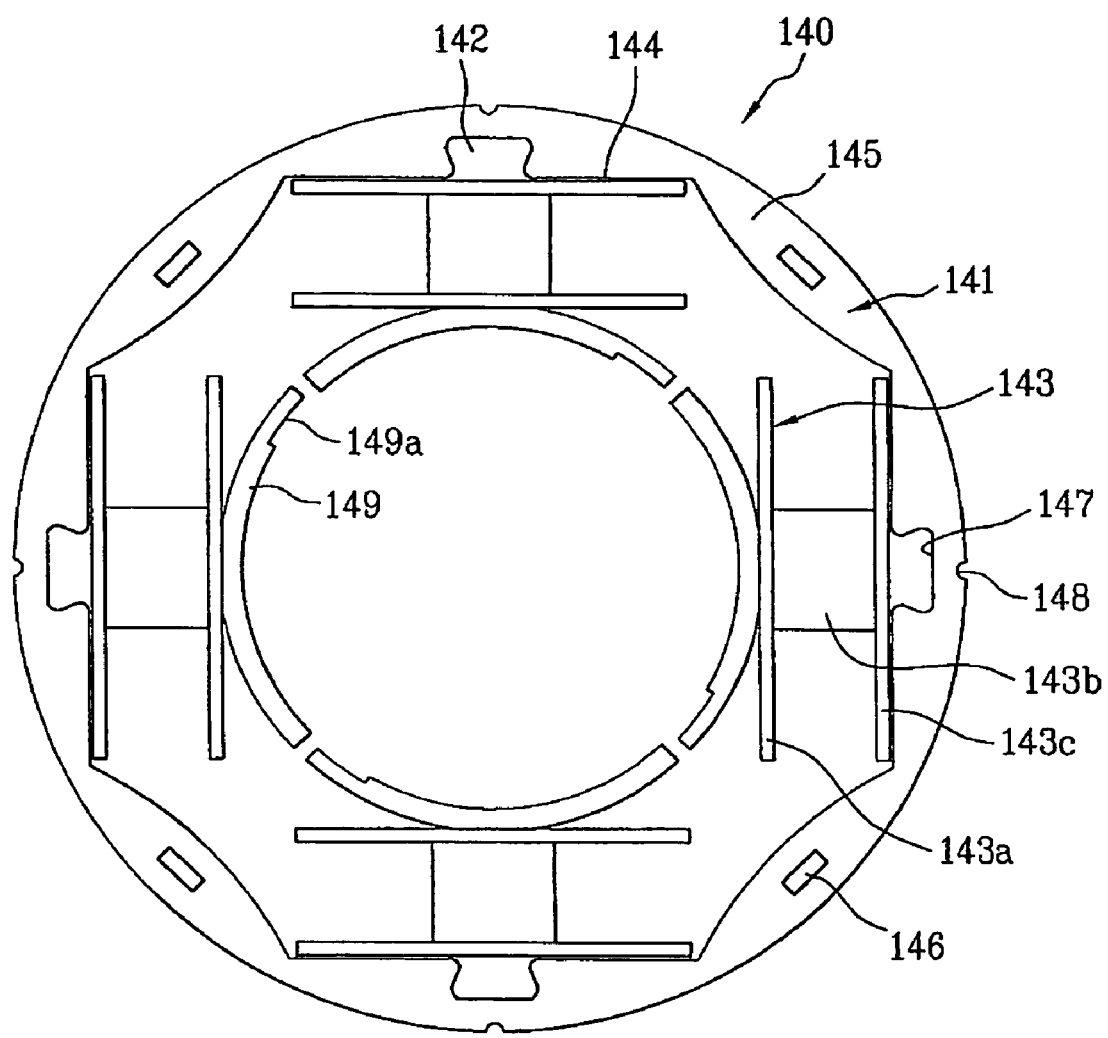
FIG. 5 is a plane view of a stator of FIG. 1.

Referring to FIGS. 1 and 5, the stator 140 of the motor will be described in detail.

The stator 140 includes a stator core 141 and a tooth 142.

As shown in the above drawings, the stator core 141 may be formed in a circular shape and forms a magnetic path. The tooth 142 is projected in a radial direction of the stator core 141 and a coil is wound around the tooth 142. The motor shown in the drawings is embodied as an inner rotor type motor in which a rotor is provided within a stator core 141. Thus, the tooth 142 is projected inwardly in a radial direction. A plurality of teeth 142 may be formed and FIG. 5 shows that four teeth 142 are formed.

A plurality of tooth parts 144 are alternated with a plurality of extension parts 145 along an inner circumferential direction of the stator core 141. Here, the teeth 142 are provided on the tooth parts 144, respectively. The extension part 145 is extending convexly and inwardly in a radial direction.

The extension part 145 may be extending inwardly and convexly between the two neighboring tooth parts 144 in a radial direction. Preferably, the extension part 145 increases its thickness entirely to secure enough space needed in forming a magnetic flux. Thereby, a leakage flux due to a high saturation on flux density is minimized to maximize an efficiency of the motor and the thickness of the stator core 141 is increased to reinforce a structural strength of the stator core 141.

Alternatively, the extension part 145 may be formed outwardly in a radial direction. But, this may enlarge the size of the stator core 141, and thereby enlarge the entire size of the motor.

The stator core 141 may be formed by multi-layering a plurality of unit stator cores. That is, a plurality of thin unit stator cores may be multi-layered to form a stator core 141 having a predetermined height. The stator core 141 formed by multi-layered unit stator cores may minimize a leakage flux, which may be formed in a perpendicular direction of the magnetic flux, to enhance the efficiency of the motor. It is also preferred that the teeth 142 are formed by a multi-layering method.

If the stator core 141 is formed by multi-layering the unit stator cores, the stator cores 141 may be fastened to each other as one body. That means that the one stator core 141 formed as one body may be necessary. Thus, a caulking part 146 may be provided to fasten the stator cores 141 to each other. The caulking part 146 is formed on the stator core 141, more specifically, on the stator core portion having a wide width. The caulking part 146 passes through an upper and lower part of the stator core 141 to minimize a leakage flux or a fringing flux due to the caulking part 146.

The caulking part 146 may be formed on the extension part 145. Preferably, the caulking part 146 is formed at a center of the extension part 145, which has the widest width.

Thereby, it is possible to perform secure caulking. The caulking part 146 may minimize distortion of the stator core 141 and may prevent efficiency deterioration.

Meanwhile, the teeth 142 may be formed as one body with the stator core 141, that is, the teeth 142 may be formed as one body with the stator core 141 from the beginning. Alternatively, the teeth 142 are formed separately from the stator core 141 and fastened to the stator core 141 to make easy the fabrication of the stator 140 as well as winding.

A tooth slot 147 is formed at a center of the tooth part 144 that formed on the stator core 141 and an end of the tooth 142 is inserted in the tooth slot 147 to fasten the tooth 142 to the stator core 141.

Thus, a tooth 142 is inserted in a bobbin 143 and a coil is wound around the bobbin 143 to insert the tooth 142 in the tooth slot 147, such that the fastening between the bobbin 143 and the tooth 142, and winding may be smooth.

Next, a groove 148 may be formed on an outer circumferential surface of the stator core 141 in a longitudinal direction of the stator core 141. Preferably, a plurality of grooves 148 may be formed along circumferential direction of an outer surface of the stator core 141.

The groove 148 helps the unit stator cores to separate from a blanking mold when the unit stator cores are blanked and molded. More specifically, the groove 148 makes the internal pressure of the mold as same as the external pressure to smoothly separate the unit stator cores from the mold. Furthermore, the groove 148 guides the unit stator cores.

It is preferred that the groove 148 is formed on an outer portion of the tooth part 147 formed on the stator core 141 to minimize variation of core size caused when the tooth 142 is inserted in the tooth slot 147. Thus, to perform this function, it is preferred that the groove 148 correspond with a center of the tooth slot 147.

It is preferred that a coil is wound around the bobbin 143 configured for insulation so that winding between a coil and the tooth 142 is done without any difficulties, instead of directly winding a coil around the tooth 142.

The bobbin 143 may be configured as an inner wall 143a, a winding part 143b and an outer wall 143c. A coil is wound around the winding part 143b between the inner wall 143a and the outer wall 143c, and the inner wall 143a and the outer wall 143c prevent the coil from coming outside.

Here, the outer wall 143c of the bobbin 143 contacts with the tooth part 144 provided on the stator core 141. Preferably, an inner wall of the tooth part 144 is plane to be contacted with the outer wall 143 of the bobbin 143, such that the bobbin 143 may be coupled to the stator core 141 more securely.

By the way, the motor may have four teeth 142, for example, as shown in FIG. 5. Hence, if power is applied to the coil wound around the tooth 142, an N-pole and an S-pole are alternatively formed on each tooth 142. As shown in FIG. 5, if an N-pole is formed on a tooth 142 provided on most upper position, an S-pole is formed on neighboring teeth.

Polarity is formed on the teeth 142 and leakage flux increases as the distance between the teeth gets farther and farther away. Thus, a pole shoe 149 may be formed on a front end of each tooth 142 to minimize the leakage flux and is extended in a predetermined length in both opposite circumferential directions to be fixedly contacted with an outer surface of the rotor 170. Thereby, the leakage flux formed between the two neighboring teeth may be minimized.

As shown in FIG. 5, the pole shoe 149 formed on one tooth 142 may not be connected to the next pole shoe 149 formed on another neighboring tooth 142. This is because two different polarities are formed on two neighboring pole shoes 149, respectively. Thus, if the two neighboring pole shoes 149 are connected, polarity may deteriorate.

Together with the pole shoe 149 formed to minimize a leakage flux, it is preferred to reduce cogging torque or torque ripple generated from the shaft 180 and the rotor 170 by drastic change of polarity between teeth. This is because the cogging torque makes the control of motor difficult and causes vibration or noise.

It is preferred to smooth the drastic change of polarity between the two neighboring teeth.

Accordingly, a cut part 149a may be formed at both opposite ends or an end of the pole shoe 149 to minimize the cogging torque. Flux density is reduced by the cut part 149a to prevent the polarity from changing drastically. A flux leakage may become large due to the cut part 149a. Thus, the cut part 149a may be formed at only one end of the pole shoe 149.

Preferably, the cut part 149a is formed at an end of the pole shoe 149 in a longitudinal direction to have a width narrower than the other portions of the pole shoe 149.

Figure 4:
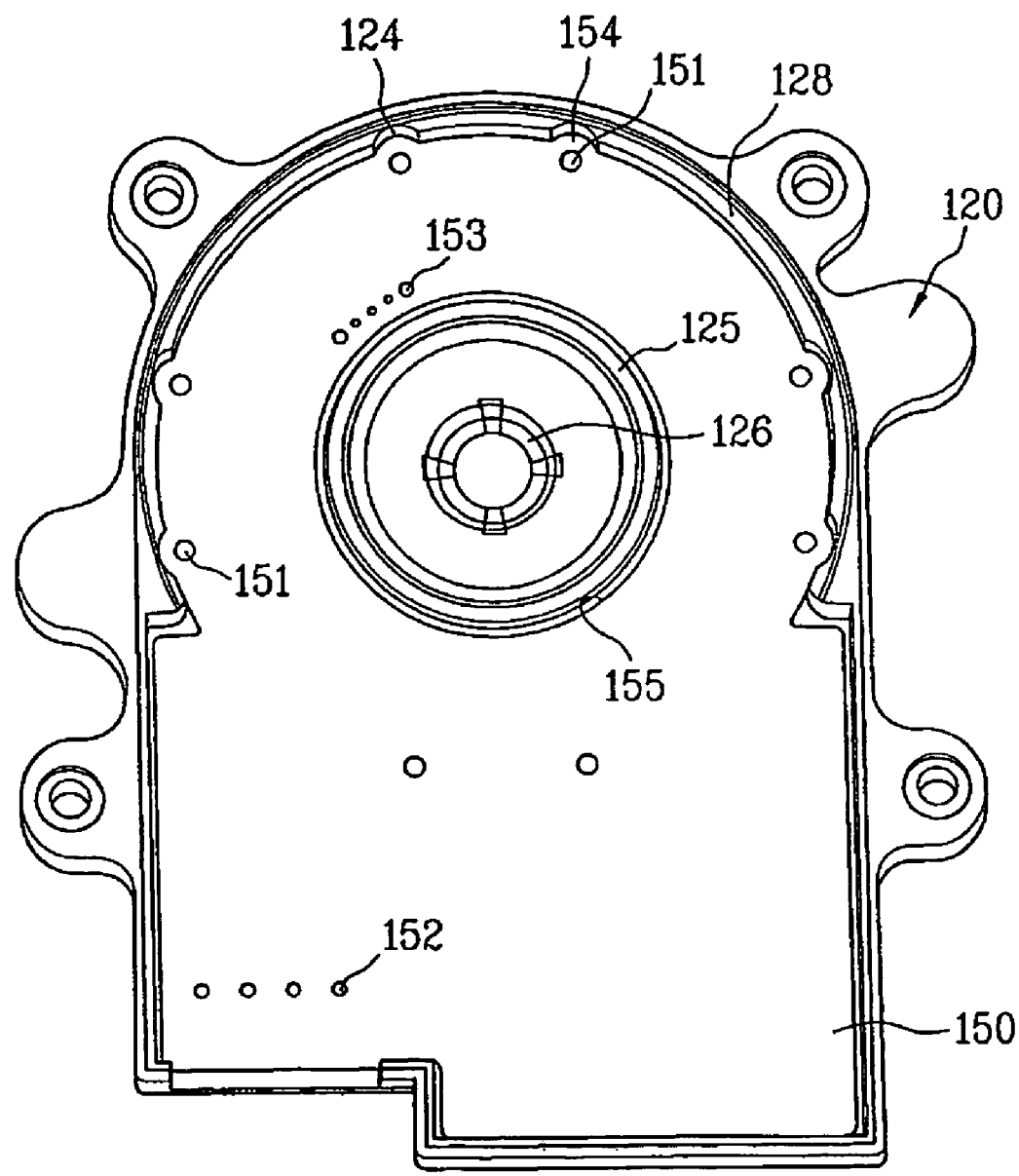
FIG. 4 is a plane view of a lower bracket of FIG. 1 that is fastened to a PCB.

Next, referring to FIGS. 1 and 4, the PCB 150 of the motor according to an embodiment of the present invention will be described in detail. Here, FIG. 4 is a plane view of the PCB 150 that is mounted on a lower bracket 120.

As shown in FIGS. 1 and 5, the stator 140 may be formed in a circular shape. Corresponding to the shape of the stator 140, at least some portion of the PCB 150 may be formed in a circular shape. As shown in FIGS. 1 and 4, an upper portion of the PCB 150 may be formed in a circular shape, where the stator 140 is seated.

A radius of the circular portion of the PCB 150 may be substantially same as that of the stator core 141. A large sized exterior of the PCB 150 may enlarge the size of the bracket 110. Hence, the entire size of the motor may become large. Accordingly, some portion of the PCB 150 may be formed in a circular shape to provide a compact sized motor.

Furthermore, because the shape of the bracket 110 corresponds with the shape of the PCB 150, exterior beauty of the motor may be enhanced.

By the way, fin 143d may be formed on a lower both opposite sides of the bobbin 143. The fin 143d is electrically connected to the coil wound around the bobbin 143. Thus, the fin 143d is inserted in a hole 151 formed on the PCB 150 to connect the PCB 150 to the coil. Once the fin 143d is inserted in the hole 151 of the PCB 150, soldering may be performed to secure electrical connection.

The fin 143d helps the stator 140 to seat on an upper portion of the PCB 150 by using the bobbin 143, as well as electrically connect the PCB 150 to the coil. Thus, the fin 143d may be formed on the boss 143e to enlarge a contact section with the PCB 150 and to carry the weight of the stator 140.

The boss 143e may be formed in a lower portion of the outer wall 143c to maintain a distance between the PCB 150 and the stator core 141.

By the way, a connector 160 is provided on a side of the PCB 150. A fin 161 is formed on an end of the connector 160 and the connector 160 is fixed to the PCB 150 through the fin 161, to electrically connect to the PCB 150. The fin 161 is inserted in a hole 152 formed on the PCB 150 and the other end of the connector 160 is exposed outside of the motor, that is outside of the bracket 110, to be connected to an external power.

Furthermore, a hall sensor assembly 190 may be provided on a portion of the PCB 150 corresponding to the position of the rotor 170. The hall sensor assembly 190 senses a rotation position or a rotational speed of the rotor 170 to control a rotation speed or torque of the rotor 170. Thus, a hole 153 is formed on the PCB 150 to fix the hall sensor assembly 190 and to electrically connect the hall sensor assembly 190 to the PCB 150.

Because four teeth 142 are provided in the motor of this example, four portions to which four bobbins 143 are coupled are provided.

As shown in FIGS. 1 and 4, some portion of the PCB 150 is formed in a circular shape. A predetermined number of the four portions are formed on a circular shaped portion of the PCB 150. As described above, this circular shaped portion corresponds with the circular shape of the stator 140.

To provide a motor having a compact size by lessening the size of the PCB 150, a predetermined number of holes 151 may be formed on an outermost portion of the circular shaped PCB portion. That is, a predetermined number of holes 151 may be formed on a circumference of the PCB 150. Because the strength of the portion having the holes 151 formed thereon may weaken, there may be a malfunction when forming the holes 151, or there may be damage to the holes 151 due to vibration and the like.

For this, it is preferred that an extension part is extended outwardly on a portion in which every hole 151 is formed. In other words, the extension part 154 secures a predetermined distance between the holes 151 and the outermost portion of the PCB 150, such that the strength of the PCB 150 is reinforced and the external shape of the PCB 150 is prevented from getting large. Furthermore, the extension part 154 enables the PCB 150 to be seated on the bracket 110 smoothly.

A hollow portion 155 may be formed on the PCB 150. The hollow portion 155 may be formed on a center of the PCB 150 and a stopper, which will be described later, is inserted in the hollow portion 155 to prevent interference between the rotor 170 and the PCB 150.

Also, because the stopper is inserted in the hollow portion 155, the PCB 150 may be more securely fixed to the bracket 110.

Next, referring to FIGS. 2 and 3, the bracket 110 of the motor will be described in detail.

As mentioned before, the bracket 110 includes a lower bracket 120 and an upper bracket 130 coupled to each other to hold various components. The lower bracket 120 may include a mounting part 123 that mounts the motor 100 to various parts the motor is applied to.

The shape of the bracket 110 corresponds with the PCB 150. The PCB 150 is seated within the bracket 110, and more specifically within the lower bracket 120.

A groove 124 corresponding to the extension part 154 may be formed on the lower bracket to seat the extension part 154 therein. This may make the position of the PCB 150 to automatically align when the PCB 150 is seated on the lower bracket 120, even more securely.

A step part 128, which will be described later, may be formed on the lower bracket 120 to mount the stator to the lower bracket 120. The step part 128 is projected a predetermined distance from an inner wall of the lower bracket 120. Preferably, the groove 124 cuts some portion of the step part 128 to prevent the shape of the bracket from becoming large due to the groove 124.

Figure 2:
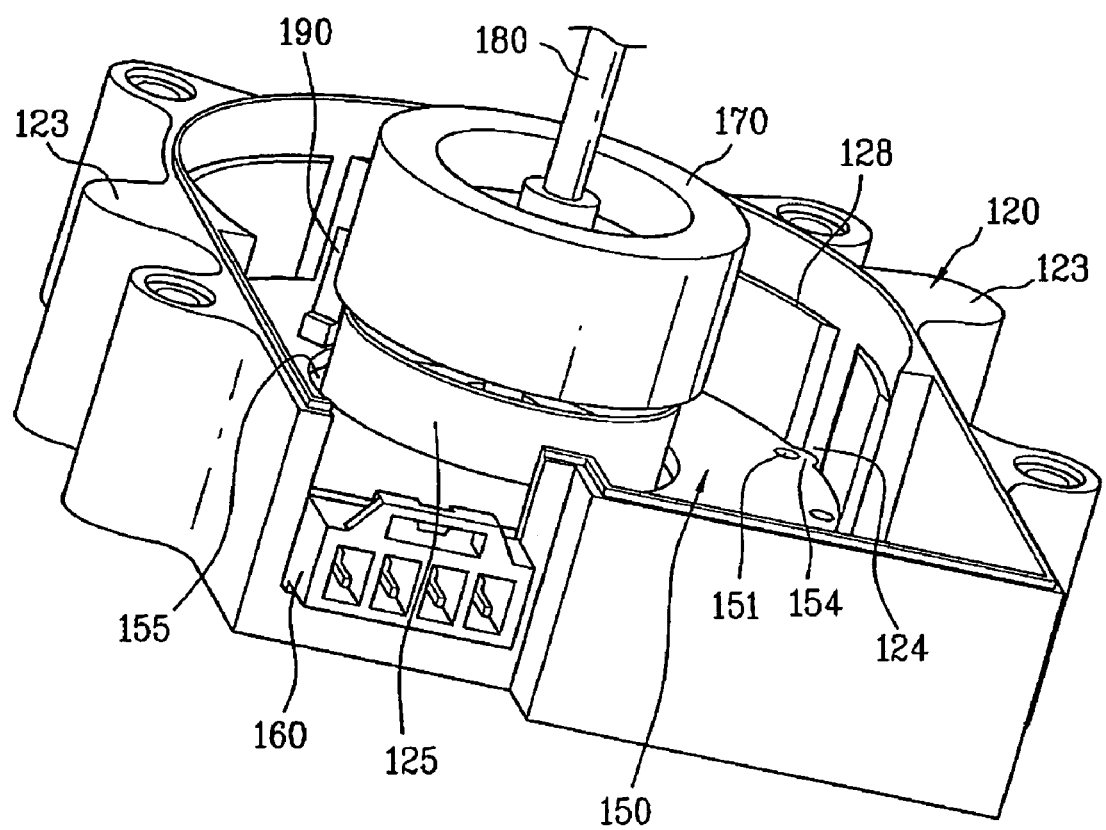
FIG. 2 is a perspective view of some parts of the motor shown in FIG. 1 that are assembled.
Figure 3:
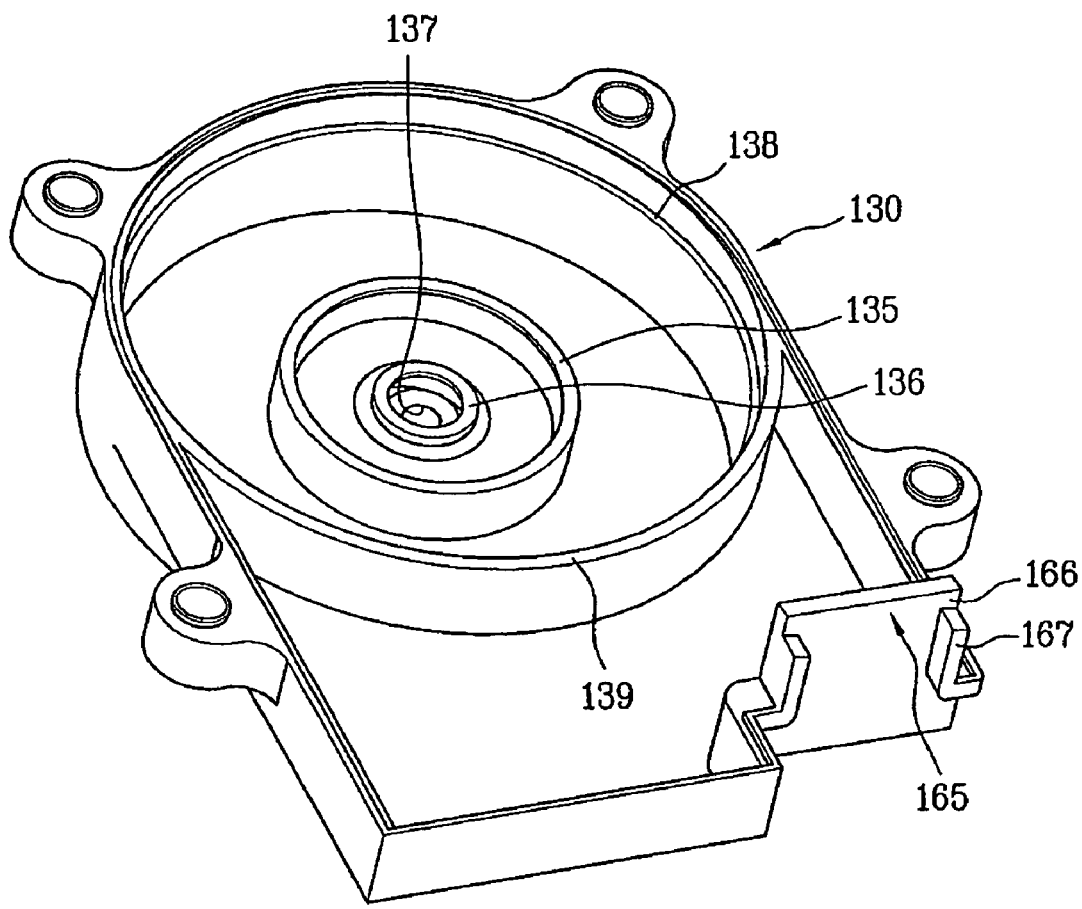
FIG. 3 is a perspective view of a down surface of an upper bracket shown in FIG. 1.

As shown in FIG. 2, the PCB 150 is mounted within the lower bracket 120. As described above, a stopper 125 is inserted in the hollow portion 155 formed on the PCB 150.

Hence, the stator 140 is imparted on the PCB 150, and the rotor 170 and the shaft 180 are provided within the stator 140.

An end of the shaft 180 is rotatably supported by the bearing 126 provided in the lower bracket 120 and a thrust is supported, too. The other end of the shaft 180 is rotatably supported by the bearing 136 provided in the upper bracket 120. Here, the shaft is exposed outside through the through hole 137 to drive load.

The shaft 180 may be inserted in the rotor 170 to rotate as one body with the rotor 170, such that the rotor 170 is prevented from moving in a longitudinal direction of the shaft 180. This is shown in FIG. 2.

However, the rotor 170 may move in a longitudinal direction of the shaft due to vibration. This may cause interference between the rotor 170 and the PCB 150 and damage the PCB 150.

Due to those problems, a stopper 125 may be formed and prevents the rotor 170 from moving along the shaft 180. The stopper 125 may be projected from an inside of the bracket and may be formed as one body with the bracket.

The stopper 125 formed as one body with the lower bracket is shown in FIGS. 1 and 2.

Preferably, a stopper 135 may be formed in the upper bracket 130 as one body with the upper bracket 130, too. The rotor 170 may be positioned between the two stoppers 125 and 135.

Thus, the stoppers 125 and 135 may prevent interference between the bracket 110 and the PCB 150 even though the rotor 170 may move along the shaft 180.

The stopper 125 and 135 may be projected in a cylindrical shape. This is because it is preferred that the stopper corresponding to the rotor 170 have a cylindrical shape. Also, an upper surface of the stopper 125 or 135 is contacts with an upper or lower surface of the rotor 170. An outer or inner diameter of the stopper 125 and 135 may be determined for that.

The stator 140 may be securely fixed within the bracket 110. For this, a step part 128 and 138 is formed on a lower and upper bracket 120 and 130, respectively.

The stator 140, more specifically, an outer circumferential surface of the stator core 141, is seated on the step part 128 and 138. Hence, as the upper bracket 130 is coupled to the lower bracket 120, the stator 140 may be securely fixed between the step parts 128 and 138.

Because the PCB 150 has been already seated on the lower bracket 120, it is difficult to form the step part 128 corresponding to the entire circumference of the stator core 141. Thus, the step part 138 may be formed corresponding to the entire circumference of the stator core 141. For this, it is preferred that an inner partition wall 139 is further formed within the upper bracket 130.

Alternatively, an inner partition wall may be formed in the lower bracket, too. If so, a through hole (not shown) may be formed on the PCB 150 so that the inner partition wall may pass there through. Thereby, this may not be preferred.

Next, referring to FIGS. 6 and 7, a connector for power connecting the motor will be described.

Figure 6:
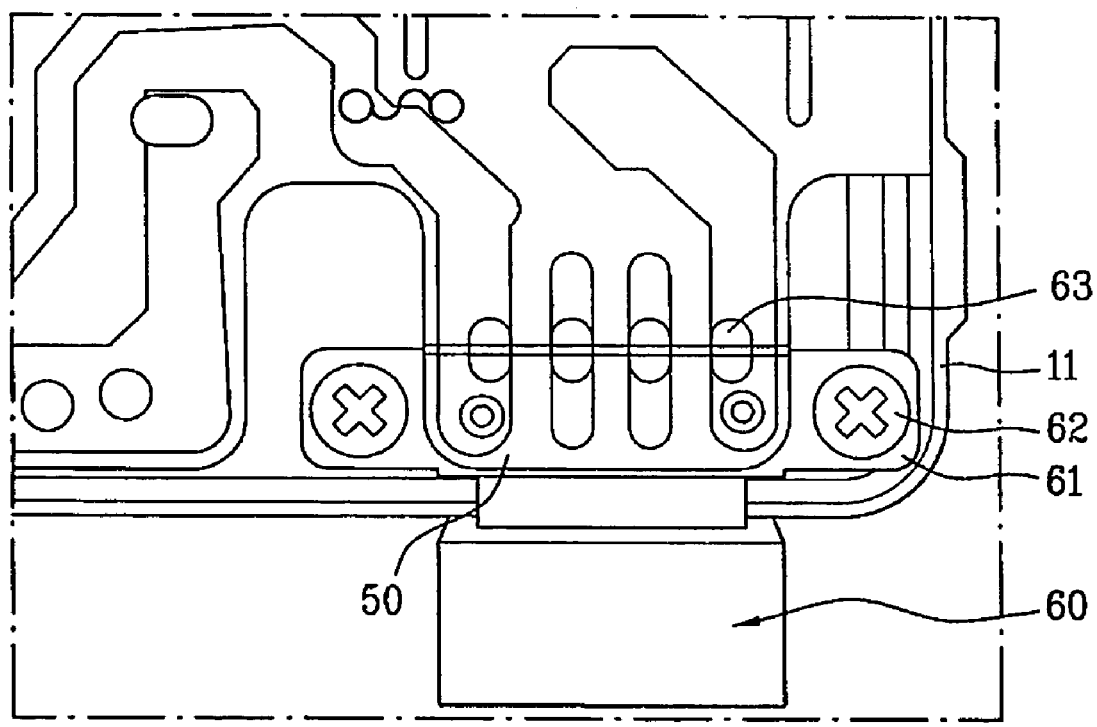
FIG. 6 is a plane view partially illustrating a fixing structure of a conventional connector for power connection.
Figure 7:
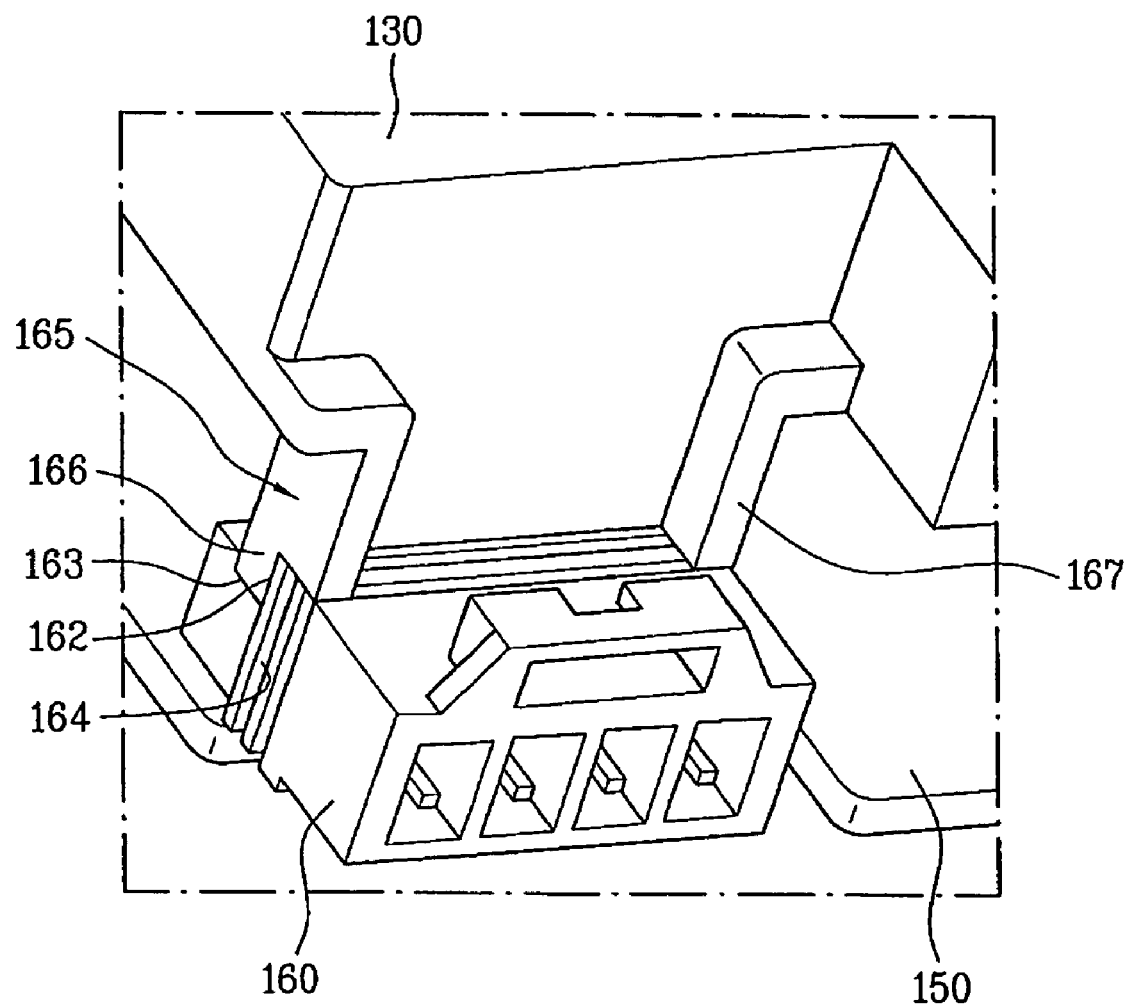
FIG. 7 is a perspective view partially illustrating a fixing structure of a connector for power connection to a motor according to an embodiment of the present invention.

FIG. 6 is a front view of a fixing structure of a conventional connector and FIG. 7 is a partial perspective view of a fixing structure of a connector according to an embodiment of the present invention.

The function of the conventional connector 60 is similar to that of the connector 160 according to the embodiment of the present invention. More specifically, the connector 60 supplies power to a PCB 50. An end of the connector 60 is connected to the PCB 50 and the other end of the PCB 50 is exposed outside of the bracket to be connected to an external power.

Here, the other end of the connector 60 is connected to an external power via a plug (not shown) and the connector 60 is subject to a lot of force when the plug is being connected or separated.

The force may be a force that pushes the connector 60 into the bracket or a force that pulls the connector 60 out of the bracket.

The connector 60 is electrically connected to the PCB 50 via soldering 63 but this connection part may be damaged by the above-mentioned external force. Thus, the external force that influences the connection part between the PCB 50 and the connector 60 has to be minimized.

For this, a wing part 61 extends from both opposite sides of the conventional connector's center, respectively. An opening (not shown) is formed on the wing part 61. Also, a boss (not shown) having a fastening hole corresponding to the opening is formed on the bracket 11.

Thus, once the connector 60 is connected to the PCB 50, the wing part 61 of the connector 60 is fastened to the boss of the bracket 11 through screws 62. Because the wing part 61 absorbs the external force, the connection part between the connector 60 and the PCB 50 may be prevented becoming damaged.

However, according to a conventional structure, the size of the connector can become large and complicated. As shown in FIG. 6, the portion of the PCB 50 where the wing part 61 is formed should be cut. Also, if auxiliary screw fastening is needed this will cause productivity to decrease if motors should be fabricated in mass. There is also a problem that the number of necessary parts will increase as well.

Therefore, the motor according to an embodiment of the present invention, the motor further includes a reinforcing part formed as one body with the upper bracket or the lower bracket to reinforce a fixing strength of the connector as the upper bracket is coupled to the lower bracket.

That is, an auxiliary part such as a screw is not needed to reinforce the fixing strength of the connector and the coupling of the upper and lower bracket may automatically reinforce the fixing strength, thereby allowing for an easier fabrication process.

FIG. 7 illustrates a reinforcing part that is formed as one body with an upper bracket.

The reinforcing part 165 may be a side wall of the upper bracket 130 and may include a projection rib 166 projected towards the connector 160. Alternatively, the projection rib 166 may be separate from a side wall of the upper bracket 130.

A stepped part 162 may be formed on the connector 160 for the projection rib 166 to contact with. Because the projection rib 166 contacts with the step part 162, an external force generated from the connector 160 may be absorbed.

The contacting process between the projection rib 166 and the step part 162 is performed simultaneously together with the coupling process between the upper and lower bracket. Thereby, the conventional process of screw fastening may be omitted.

The step part 162 absorbs only the force that pushes the connector 160 into the bracket. Thus, the step part 162 may be formed to include a groove part 163 to absorb the force that pulls connector 160 out of the bracket 110, as well. The projection rib 166 is inserted in the groove part 163 to absorb the force in both directions.

The reinforcing part 165 may further include a reinforcing rib 167 to reinforce the strength of the projection rib 166. The reinforcing rib 167 may be formed on an inner and outer portion of the bracket, respectively.

Alternatively, the reinforcing rib 167 may be perpendicular to the projection rib 166. Here, it is preferred that some portion of the reinforcing rib 167 contacts with an upper surface of the connector 160. This is because the connector 160 may be more securely fixed by the increase of the section in contact with the upper bracket 130 and the connector 160.

Furthermore, a groove 164 may be formed on an outer circumferential surface of the connector 160 in a horizontal direction to securely fix the connector 160.

Some portion of the lower bracket 120 may be inserted in the groove 164 to reinforce the fixing strength of the connector.

Therefore, the following advantageous effects may be obtained.

First, the motor may be fabricated without difficulties and the exterior of the motor may be compact. Thus, there is an advantageous effect that space occupied by the motor may be reduced, and the motor has broader applications.

Second, the motor has reduced leakage flux. Thus, there is another advantageous effect that motor efficiency is enhanced with minimal electricity loss.

Third, the motor has a further advantageous effect in that it may minimize vibration by reducing cogging torque and control the rotational speed of the shaft and torque more smoothly.

Finally, the motor may be prevented from malfunctioning, which may occur in the fabrication process or usage. Thus, there is a further advantageous effect that a motor having high reliability as well as high durability may be provided.

It will be apparent to those skilled in the art that various modifications and variations can be made without departing from the spirit or scope of the inventions. Thus, it is intended that the present invention covers the modifications and variations provided they come within the scope of the appended claims and their equivalents.

What is claimed is:

1. A motor comprising:
   a bracket that defines an exterior of the motor;
   a PCB (printed circuit board) held within the bracket, the PCB having a circuit pattern and various elements mounted thereon;
   a stator directly mounted on the PCB;
   a rotor provided within the stator and having permanent magnets;
   a shaft that rotates together with the rotor to transmit a rotational force of the rotor;
   a stopper formed as one body with the bracket to prevent the rotor from moving along the shaft; and
   a connector having an end electrically connected to the PCB and an other end exposed outside of the bracket to be connected to an external power,
   wherein the bracket comprises a lower bracket in which the PCB is seated and an upper bracket coupled to the lower bracket, and having the shaft pass there through, and the connector provided with the upper and lower bracket, and the bracket further comprises
   a groove with the connector of one of the upper bracket and the lower bracket; and
   a projection rib with the connector of the other of the upper bracket and the lower bracket to be inserted into the groove when the upper bracket is coupled to the lower bracket.

2. The motor of claim 1, wherein a step part is formed on the groove of the connector and a shape of the projection rib corresponds with the step part.

3. The motor of claim 1, wherein the PCB has at least some portion configured to correspond with an external shape of the stator.

4. The motor of claim 1, wherein a shape of the bracket corresponds with a shape of the PCB.

* * * * *